US009513435B1

(12) United States Patent
Sun et al.

(10) Patent No.: US 9,513,435 B1
(45) Date of Patent: Dec. 6, 2016

(54) HYBRID INTEGRATED OPTICAL DEVICE ENABLING HIGH TOLERANCE OPTICAL CHIP BONDING AND THE METHOD TO MAKE THE SAME

(71) Applicant: LaXense Inc., Walnut, CA (US)

(72) Inventors: Xiaochen Sun, Chino Hills, CA (US); Ningning Feng, Arcadia, CA (US)

(73) Assignee: LAXENSE INC., Walnut, CA (US)

( * ) Notice: Subject to any disclaimer, the term of this patent is extended or adjusted under 35 U.S.C. 154(b) by 0 days.

(21) Appl. No.: 14/886,614

(22) Filed: Oct. 19, 2015

(51) Int. Cl.
*G02B 6/12* (2006.01)
*G02B 6/136* (2006.01)

(52) U.S. Cl.
CPC ....... *G02B 6/12002* (2013.01); *G02B 6/12004* (2013.01); *G02B 6/136* (2013.01); *G02B 2006/12061* (2013.01); *G02B 2006/12078* (2013.01); *G02B 2006/12152* (2013.01)

(58) Field of Classification Search
CPC . G02B 6/12002; G02B 6/12004; G02B 6/136; G02B 2006/12061; G02B 2006/12078; G02B 2006/12152; G02B 6/14; G02B 6/24; G02B 6/26; G02B 6/32; G02B 6/34
See application file for complete search history.

(56) References Cited

U.S. PATENT DOCUMENTS

| 5,499,312 | A | 3/1996 | Hahn et al. | |
|---|---|---|---|---|
| 6,293,688 | B1 | 9/2001 | Deacon et al. | |
| 6,391,214 | B1 | 5/2002 | Kovacic et al. | |
| 6,693,936 | B2 | 2/2004 | Kitaoka et al. | |
| 6,841,860 | B2 | 1/2005 | Lee et al. | |
| 6,992,276 | B2 * | 1/2006 | Blauvelt | G02B 6/4204 250/214.1 |
| 7,522,648 | B2 | 4/2009 | Park et al. | |
| 8,300,993 | B2 * | 10/2012 | Moll | G01N 21/552 385/14 |
| 8,331,751 | B2 * | 12/2012 | Delaney | G01N 21/552 385/129 |

(Continued)

OTHER PUBLICATIONS

Goodwill et al., "Polymer Tapered Waveguides and Flip-Chip Solder Bonding as Compatible Technologies for Efficient OEIC Coupling", 1997 Electronic Components and Technology Conference, IEEE, pp. 788-796, May 18, 1997.

(Continued)

*Primary Examiner* — John M Bedtelyon
(74) *Attorney, Agent, or Firm* — Chen Yoshimura LLP

(57) ABSTRACT

An optical device includes an optical bench and two flip-chip bonded optical chips. The optical bench includes a large area slab waveguide structure which has an input facet facing the first optical chip, an output facet facing the second optical chip, and one or more curved facet which reflects the slab mode light such that the input optical mode coupled through the input facet diverges in the slab waveguide plane as it propagates, reflects at the one or more curved facets, and focuses to an output optical mode at the output facet with mode size larger than the input optical mode in the in-plane direction. During fabrication, after the first optical chip is flip-chip bonded, the location of the focused output optical mode on the output facet is determined, and then the second optical chip is flip-chip bonded based on the determined location of the output optical mode.

13 Claims, 6 Drawing Sheets

(56) References Cited

U.S. PATENT DOCUMENTS

| 8,798,409 | B2 | 8/2014 | Pardo et al. |
| 2002/0197010 | A1 | 12/2002 | Kato et al. |
| 2013/0094240 | A1* | 4/2013 | Boonekamp ......... G02B 6/0001 362/559 |

OTHER PUBLICATIONS

Dahms et al., "Self-Aligned Laser-Fiber Coupling Using Tin/Gold (20/80) Solder on Micro-Optical Silicon Benches", Proceedings of SPIE vol. 3952, pp. 410-417, 2000.
Thacker et al, "Flip-Chip Integrated Silicon Photonic Bridge Chips for Sub-Picojoule Per Bit Optical Links", 2010 Electronic Components and Technology Conference, pp. 240-246.

* cited by examiner

HYBRID INTEGRATED OPTICAL DEVICE ENABLING HIGH TOLERANCE OPTICAL CHIP BONDING AND THE METHOD TO MAKE THE SAME

BACKGROUND OF THE INVENTION

Field of the Invention

The invention relates to an optical device with hybrid integrated optical waveguide chips. In particular, the invention relates to an optical device using passively aligned flip-chip bonding method to hybrid integrate two optical waveguide chips with different optical waveguide mode size on an optical bench which reduces the required bonding alignment accuracy through its specially designed slab waveguide structures.

Description of Related Art

Optical interconnects are adopted in data communications at unprecedented rate as more bandwidth and longer transmission reach are required by mega datacenters for applications from social networks, cloud service, to big data analysis and high performance computing. Unlike optical transceiver modules or subsystems made of ultrahigh performance discrete components in telecommunications, lower cost, more compact and more power efficient optical transceivers or engines are demanded in data communications. Integrating multiple optical components or chips such as lasers, modulators, photodetectors, switches, attenuators and etc. on an optical bench chip to form a hybrid integrated optical device is one way to reduce assembling cost and footprint.

In such hybrid integrated optical devices, passively placing and bonding the optical chips on optical benches is highly preferred as it enables automated low cost assembling for massive volume production required by huge data communications market. However, unlike the mature integrated circuit (IC) fully automated packaging processes, assembling these optical chips requires very precise alignment, on the order of micrometer or less, because these chips and optical benches usually include tiny optical waveguides which must be well aligned with each other to form an optical transmission path.

Borrowing from the IC packaging industry, people have been trying to use the tools called flip-chip bonder to bond the optical chips upside down onto an optical bench. Because the optical waveguides are almost always formed on the top side of an optical chip and an optical bench by semiconductor or similar wafer processing techniques, the distance between the optical waveguide and the top surface is well controlled. By placing an optical chip upside down onto an optical bench and with some pre-defined spacer structures on the optical bench, the optical waveguide alignment in the direction perpendicular to the surface (out-of-plane) of the optical chip and the optical bench can be precisely controlled. This flip-chip bonding approach has been widely discussed.

On the other hand, the alignment in the directions parallel to the surface (in-plane) is determined by the flip-chip bonder's accuracy and the specific bonding process. A modern top-of-the-line flip-chip bonder can achieve a +/−0.5 micrometer alignment accuracy, however, in practice, the bonding involving processes, including thin film metal solder melting, adhesive curing, etc., inevitably contributing to final alignment error due to physical movement of the chip under temperature, stress or material phase change. The final alignment error (3σ confidence interval) is something close to +/−2 micrometers or larger based on industrial test data and tests performed by the inventors of this invention. The alignment of in-plane direction along optical propagation in a waveguide is relatively tolerant and can stand this alignment error. However, the alignment of in-plane direction perpendicular to optical propagation requires high accuracy, especially for small optical waveguides on the micrometer scale such as those in lasers. To increase the alignment tolerance in this direction, people tried to include either a taper structure at the end of the waveguide or a lens structure in order to expand the optical beam for more tolerant alignment. However, including a taper structure as part of the optical waveguide requires design change of the optical chips which prohibits the use of widely available and proven commercial chips as well as, in many cases, harms device performance. The lens which can be used in such condition cannot be made monolithically on the optical bench and has to be installed separately which introduces additional alignment error during the assembling. These and similar methods have been proposed but none of them is being adopted in mass production due to above-stated issues.

SUMMARY

The optical devices according to embodiments of the present invention significantly increase the alignment tolerance between two optical chips in the in-plane direction perpendicular to optical propagation.

One embodiment is an optical device. The optical device includes an optical bench and two optical chips. The optical bench includes a large area slab waveguide structure, thin film metal traces, thin film micro solders, and etched spacers formed on its first side. The first optical chip includes a small optical waveguide and thin film metal pads formed on its first side. The second optical chip includes a relatively wider optical waveguide and thin film metal pads formed on its first side.

The first optical chip is aligned to and flip-chip bonded on the optical bench with its first side towards the first side of the optical bench. The waveguide on the first optical chip and the waveguide on the optical bench are in good alignment in out-of-plane direction guaranteed by the spacers formed on the first side of the optical bench. The large slab waveguide structure on the optical bench confines light transmitted from the optical chip in the out-of-plane direction while allows the light to diverge freely in the in-plane direction so that the light propagates as a slab mode resembling free space light propagating in only the in-plane direction. The slab waveguide structure includes at least one curved facet coated with metal as a mirror to reflect the slab mode light such that the incoming light coupled through the input facet, as an input optical mode, diverges in the slab waveguide plane as it propagates, reflects at one or a plurality of the curved facets, and focuses to an output optical mode at the output facet with mode size larger than the input optical mode in the in-plane direction. When the first optical chip is possibly misaligned in the in-plane direction after flip-chip bonding, the location of the output optical mode can be determined by either the calculation based on the measured misaligned value of the first optical chip or the direct optical measurement of its location at the output facet. Based on the location of the output optical mode, the second optical chip is aligned to and flip-chip bonded on the optical bench. Because both the output optical mode at the output facet of the optical bench and the optical waveguide mode of the second chip are relatively wide, it is less sensitive to the misalignment in the in-plane direction. Hence the overall optical coupling from the first optical chip with a small waveguide to the second optical chip with a wider waveguide benefits from the use of the optical bench to reduce the optical loss due to misalignment of passive flip-chip bonding process. This technique can be used on a wafer level when the optical bench is made by semiconductor wafer processing technology. Such a wafer-level chip assembling technique significantly increases productivity and reduces cost.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1A:
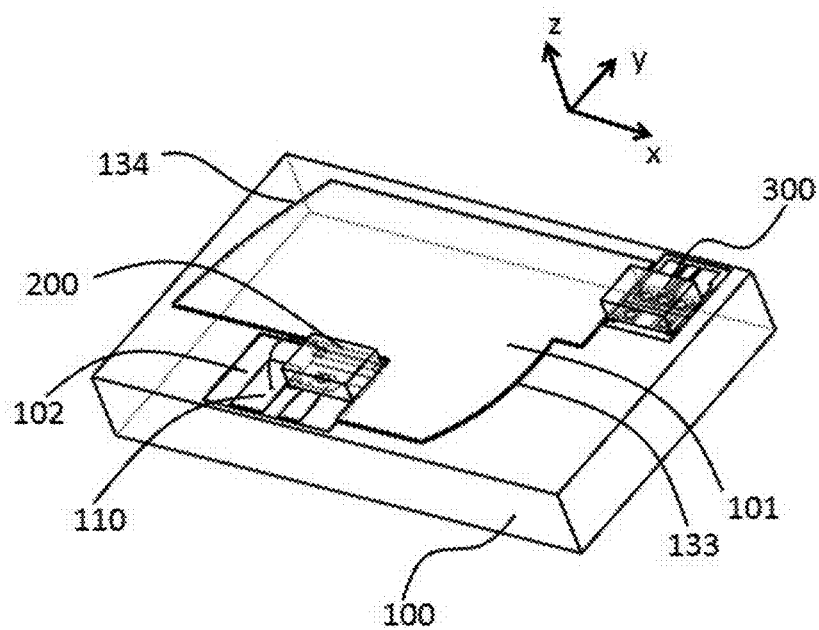
FIG. 1A is a perspective view illustrating a hybrid integrated optical device according to an embodiment of the present invention.
Figure 1B:
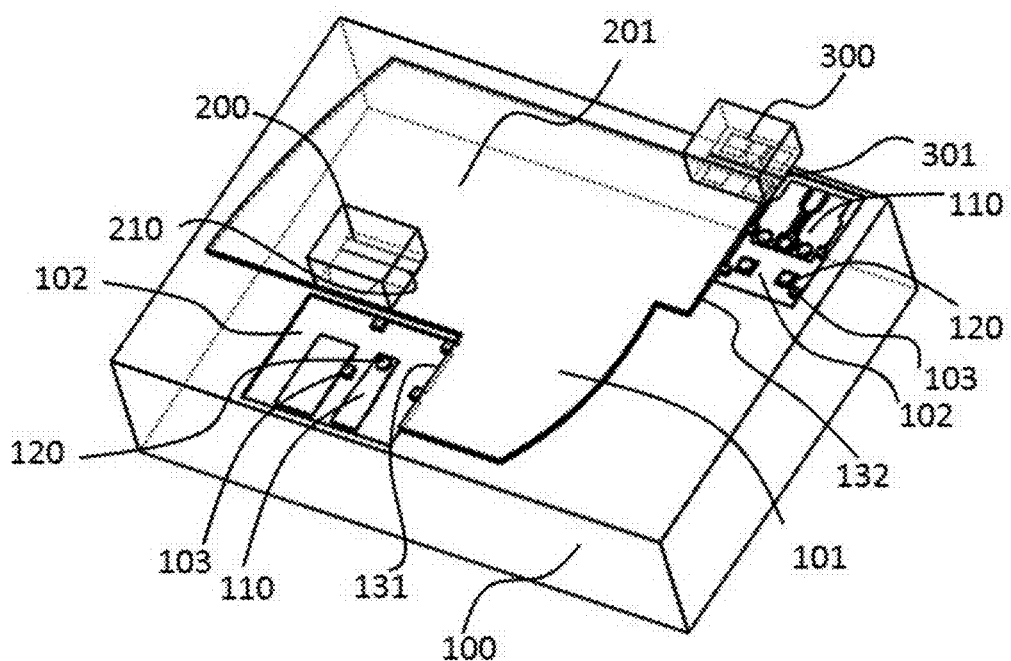
FIG. 1B is an exploded view illustrating the hybrid integrated optical device shown in FIG. 1A.

An embodiment of the present invention is described with reference to FIGS. 1A-1B. The optical device includes an optical bench with at least one large area slab optical waveguide, an etched trench, spacers, metal traces and micro solders; a flip-chip bonded first optical chip with at least one optical waveguide; and a flip-chip bonded second optical chip with at least one optical waveguide. FIG. 1A is a perspective view illustrating the hybrid integrated optical device while FIG. 1B is an exploded view. The components are drawn in a way as if they were transparent for the purpose of easy observation of structures behind (structures behind other structures are shown in dashed lines). The hybrid integrated optical device includes an optical bench 100, a flip-chip bonded first optical chip 200 and a flip-chip bonded second optical chip 300. The optical bench 100 can be made of any semiconductor or insulating materials including, but not limited to, silicon, silica, and indium phosphide. The optical bench 100 includes a first side and a second side generally opposite to the first side. The optical bench 100 further includes at least one large area slab optical waveguide 101 on the first side formed by etching or deposition technologies. The waveguide 101 is made of optical transparent materials including, but not limited to, silicon, silicon nitride, and indium gallium arsenide phosphide. The optical bench 100 further includes a trench 102 and multiple spacers 103 formed by etching or deposition technologies. The depth of both the trench 102 and spacers 103 are precisely controlled using semiconductor processing techniques. The optical bench 100 further includes metal traces 110 and micro solders 120 in the trench 102 for the purpose of electrically connecting to the flip-chip bonded optical chips 200 and 300. The slab waveguide 101 includes at least one input facet 131 and at least one output facet 132, both of which are facing its corresponding trench and both are coated with anti-reflection coating to reduce light reflection. The slab waveguide 101 further includes at least one curved facet coated with metal as a mirror to reflect the slab mode light such that the incoming light coupled through the input facet 131, as an input optical mode, diverges in the slab waveguide plane as it propagates, reflects at one or a plurality of the curved facets, and focuses to an output optical mode at the output facet 132 with mode size larger than the input optical mode in the in-plane direction. In the illustrated embodiment in FIG. 1A, two such curved facets 133 and 134 are used for good optical performance which is explained later.

The first optical chip 200 can be made of any semiconductor or insulating materials including, but not limited to, silicon, silica, and indium phosphide. The optical chip 200 includes a first side and a second side generally opposite to the first side. The optical chip 200 further includes at least one optical waveguide 201 on the first side. The optical chip 200 can be an active device which requires external electrical power to operate. An active device can include, but not limited to, a laser, an optical modulator, a photodetector, an optical amplifier, an optical attenuator, and/or an optical switch. The optical chip 200 further includes electrodes 210 to receive external electrical power.

The optical chip 200 is bonded on to the optical bench 100 though a flip-chip process in which the optical chip 200 is flipped thus its first side faces the first side of the optical bench 100. The optical chip 200 is then aligned to the optical bench 100 by aligning the marks on the first side of the optical chip and the first side of the optical bench. The alignment marks are not illustrated in the figures. The optical chip 200 is then push on to the optical bench 100 while heating up either or both the chip 200 and bench 100. The optical chip is stopped by the spacer 103 from further descending. The micro solders 120 are melted to form electrical connection and mechanical bonding between the metal trace 110 and the electrode 210. The light coming out of the optical waveguide 201 is coupled to a location P21 (see FIG. 2A) at the input facet 131 of the slab waveguide 101 and forming an input optical mode at the location P21. The mode shape and mode size of the input optical mode is similar to that of the optical waveguide mode of the waveguide 201 due to the near field coupling.

The second optical chip 300 can be made of any semiconductor or insulating materials including, but not limited to, silicon, silica, and indium phosphide. The optical chip 300 includes a first side and a second side generally opposite to the first side. The optical chip 300 further includes at least one optical waveguide 301 on the first side. In a preferred embodiment, the optical waveguide is wider than the optical waveguide 210 of the first optical chip 200. The optical chip 300 can be an active device which requires external electrical power to operate. An active device can include, but not limited to, laser, modulator, photodetector, amplifier, attenuator, and/or switch. The optical chip 300 further includes electrodes 310 to receive external electrical power.

The optical chip 300 is bonded on to the optical bench 100 though the same flip-chip process described earlier except that the optical chip 300 is aligned to a certain location P22 (see FIG. 2A) at the output facet 132 and the location P22 is where the focused output optical mode resides, influenced by the possible in-plane misalignment of the first optical chip 200 after flip-chip bonding, and determined by some methods explained later.

Figure 2A:
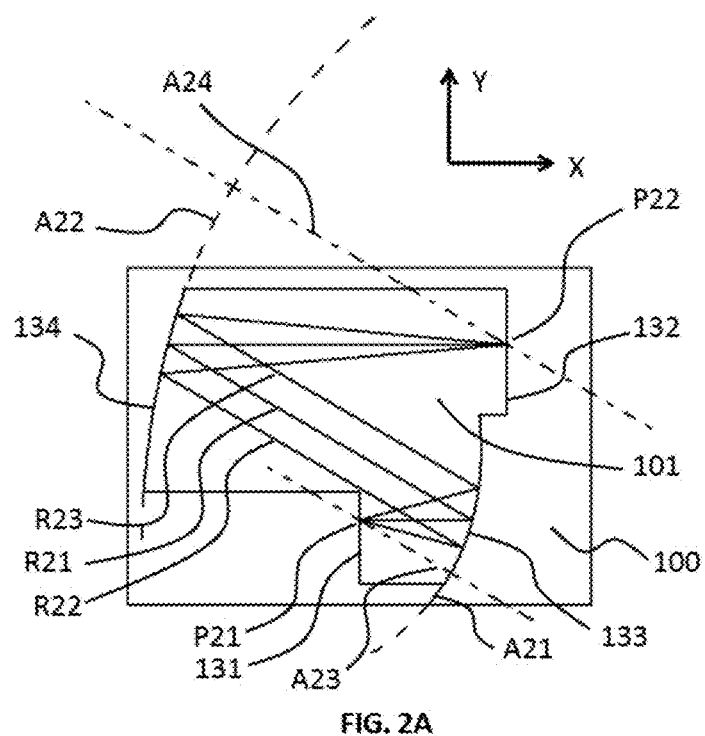
FIG. 2A is a schematic illustrating the working principle of the hybrid optical device shown in FIG. 1A by using a ray optics approach to analyze the in-plane optical wave.

FIG. 2A illustrates the working principle of the hybrid optical device described in FIG. 1A by using a ray optics approach to analyze the in-plane optical wave. In this embodiment, two curved facet mirrors 133 and 134 are adopted. When the light coming from the waveguide 201 of the first optical chip 200 couples into the slab waveguide 101 through the input facet 131, it is confined in the out-of-plane direction due to the wave guiding layer structure of the slab waveguide 101 while it propagates freely and thus diverges in the slab plane if its in-plane diverging optical field does not contact any facets or disturbance during propagation. Such in-plane optical propagation can be treated as though it propagates in two-dimensional free space and the ray optics approach can be used to analyze the behavior of the optical wave.

In such consideration, the first curved facet mirror 133 collimates the optical wave in the slab plane while the second curved facet mirror 134 focuses the optical wave therefore the design effectively resembles a "two-lens optical system" in the slab plane. To minimize the optical aberration of such effective "lens system", the outlines of these two curved facet mirrors 133 and 134 are designed to be parts of two parabolic curves A21 and A22, respectively. The axes of symmetry of these two parabolic curves A21 and A22, shown as dashed lines A23 and A24, are parallel to each other and form a certain angle with the propagation direction of the optical waveguide 201 of the first optical chip 200 such that the diverging and reflected light does not propagates back thus be blocked by the optical chip 200. The first curved facet mirror 133 is arranged such that at the location P21 the input optical mode coincides with the focus of the parabolic curve A21 and therefore the diverging optical wave, graphically represented by three optical rays R21, R22, and R23 which are at the center and the two edges of the diverging optical field respectively, is collimated by the first curved facet mirror 133 in the slab plane and propagates toward the second curved facet mirror 134. The collimated optical wave is then focused by the second curved facet mirror 134 and form a focused output optical mode at the focus P22 of the parabolic curve A22, and the slab waveguide 101 is designed such that the focus P22 is located at its output facet 132. The focal length, which is defined as the distance between the focus and the vertex of a parabola, of the parabolic curve A22 is designed to be a few times larger than that of the parabolic curve A21, and therefore the mode size in in-plane Y direction (which is perpendicular to the direction of the waveguides 201 and 301 of the chips 200 and 300) of the output optical mode is a few time larger than that of the input optical mode as a result of the optical wave principle. Therefore, when aligning the second optical chip 300 with optical waveguide mode size matching to that of this output optical mode, the alignment tolerance can be greatly relaxed.

Although the optical bench 100 of the embodiment shown in FIGS. 1A and 2A includes two curved facet mirrors 133 and 134 to archive an enlarged output optical mode at the output facet 132, the same principle can be achieved by using a single curved facet mirror to resemble a "single-lens optical system". In such case, the outline of the curved facets may be a part of a circular curve, a parabolic curve, or a numerically calculated curve to minimize the optical aberration.

Figure 2B:
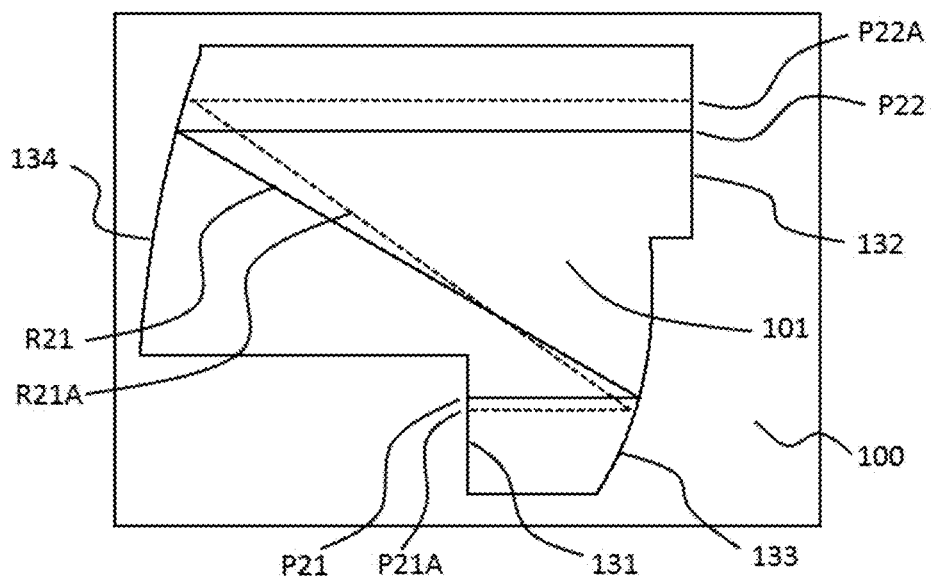
FIG. 2B is a schematic illustrating the shift of the location of the focused output optical mode when the input optical mode shifts due to the in-plane misalignment of the first optical device.

While FIG. 2A illustrates the working principle when the first optical chip 200, and hence the input optical mode, is perfectly aligned according to the design, FIG. 2B illustrates the situation when it is misaligned which is probably inevitable in practice. To simplify the drawing, only the optical rays R21 and R21A, representing the center of the optical field of the ideally aligned and misaligned input optical mode respectively, are drawn. When the location of the misaligned input optical mode P21A is much smaller than the focal lengths of both of the parabolic curves A21 and A22, which is true as the misalignment of a good flip-chip bonding process is usually within 2-3 μm range compared to the focal lengths which are on the order of hundreds of micrometers, the output optical mode is still roughly located at the output facet 132 but with a small shift to location P22A instead of the designed location P22. As long as the shifted location P22A can be determined, the second optical chip 300 can be aligned to this new location instead of designed ideal location P22.

Figure 3:
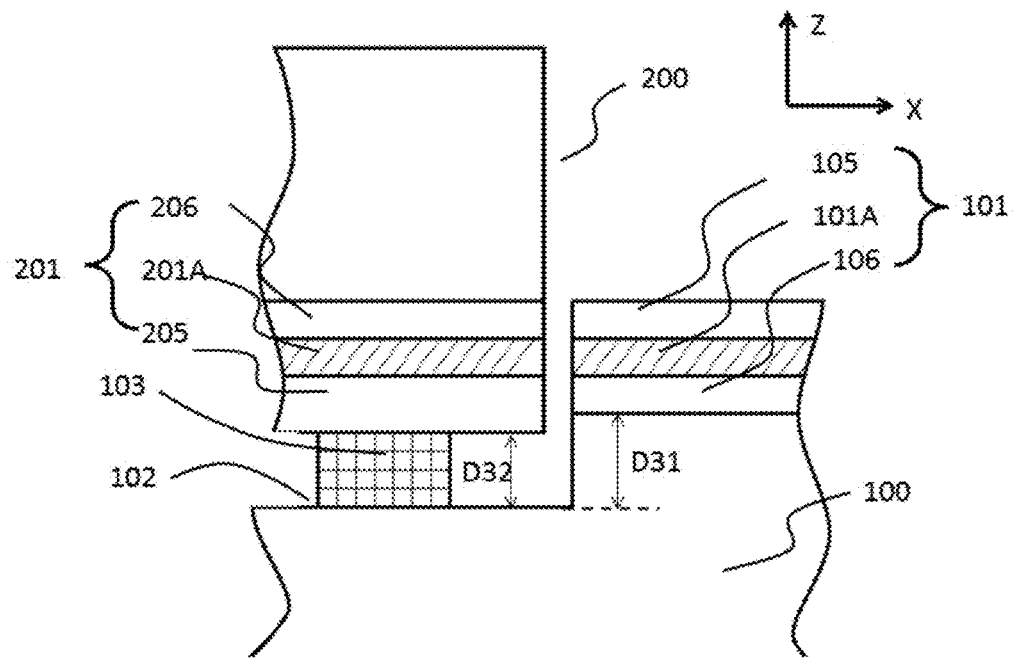
FIG. 3 is a cross-sectional view illustrating the out-of-plane alignment between a waveguide on the optical device and a waveguide on the optical bench of the hybrid integrated optical device shown in FIG. 1A.

In hybrid integration, the goal of the flip-chip bonding is to accurately align the waveguides of an optical chip and an optical bench so light can transmit from one waveguide to another with minimal optical loss. FIG. 3 illustrates the out-of-plane (the direction perpendicular to the first side of the optical bench or the optical chips) alignment between two waveguides, e.g. one waveguide 201 belongs to the optical device 200 and the other waveguide 101 belongs to the optical bench 100. A waveguide (e.g. 201) is always surrounded by cladding layers (e.g. 205 and 206) which has lower refractive index to make light confined in the waveguide core layer 201A. The thicknesses of these cladding layers are usually well defined by semiconductor or other wafer processing techniques, so the distance between the optical waveguide core (e.g. 201A) and the surface of the cladding layer (e.g. 205) is well controlled. By placing an optical chip 200 upside down onto an optical bench and with the pre-defined spacer 103 on the optical bench, the optical waveguide alignment in the out-of-plane direction of the optical chip and the optical bench can be precisely controlled. The optical bench includes precisely etched trench 102 and spacer 103. The spacer 103 serves as a stop for the flipped chip when it is pushed onto the optical bench. With precisely controlled trench 102 depth (D31) and spacer 103 height (D32), the waveguide 101 and waveguide 201 can be aligned accurately in the out-of-plane direction.

One of keys to the working principle of the invention presented here is to be able to determine the shifted location P22A of the output optical mode relative to the design ideal location P22 when the first optical chip 200 is misaligned. It can be determined by either a calculation based on the measured misaligned value of the first optical chip 200 or by direct optical measurements at the output facet 132.

Figure 4:
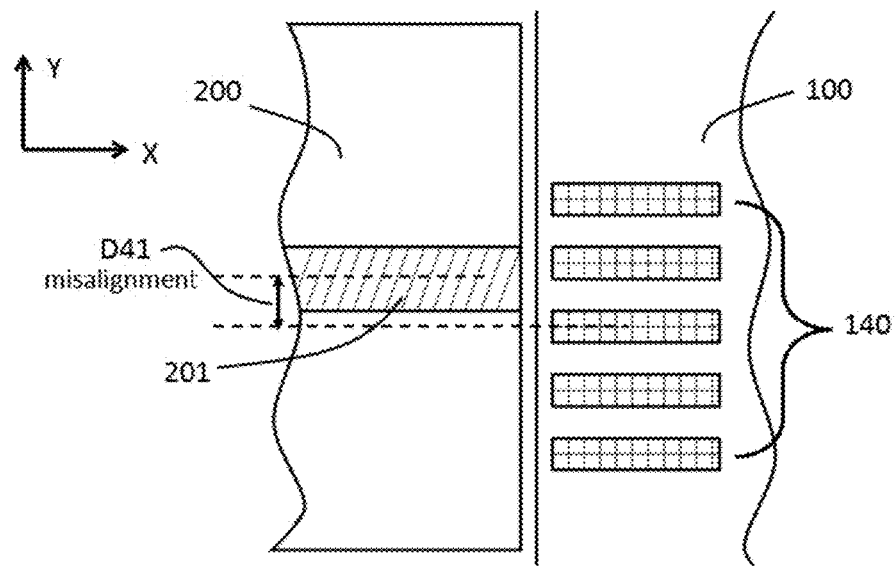
FIG. 4 is a view illustrating the in-plane misalignment between a waveguide on the first optical device and the designed incident location of the slab waveguide on the optical bench of the hybrid integrated optical device shown in FIG. 1A.

FIG. 4 illustrates the in-plane (in the plane parallel to the first side of the optical bench or the optical chip) alignment between two waveguides, e.g. one waveguide 201 belongs to the optical device 200 and the other waveguide 101 belongs to the optical bench 100. The alignment in the waveguide propagation direction (indicated by "X" direction in FIG. 4) has relatively large tolerance while the direction perpendicular to waveguide propagation (indicated by "Y" direction in FIG. 4) requires accurate alignment, especially for small optical waveguides such as those in lasers. The latter one is the focus in the embodiments of this invention. In the illustrated example in FIG. 4, there is a misalignment in the "Y" direction. The optical bench 100 includes a group of marks 140, made by means including etched structure, patterned thin film metal or other materials, etc., on top of the slab waveguide 101 near the designed location of the input optical mode P21. One can use an optical microscope under either visible light or infrared light to examine the location of the optical waveguide 201 through the body of the first optical chip 200 with respect to the marks 140 and calculate the misalignment value D41. By doing optical calculation, one can determine the shifted location P22A of the output optical mode.

Figure 5:
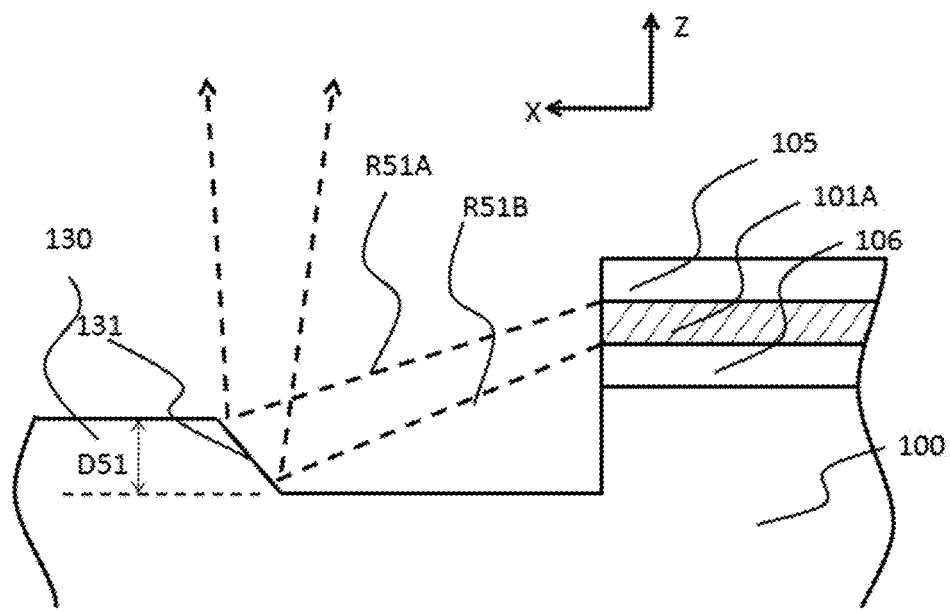
FIG. 5 is a cross-sectional view illustrating the etched structure to help measure the optical mode center at the facet of a waveguide on the optical bench of the hybrid integrated optical device shown in FIG. 1A.

Another method is to directly measure the location of the output optical mode. One way to measure it is to examine the output light spot from the side of the output facet 132 under a microscope. But it requires relatively complex side view microscopic system and measurement on a single optical bench die level. A preferred approach is to measure the output light spot from above thus a straightforward microscopic system and wafer-level measurement can be adopted. To facilitate such top view measurement, the optical bench 100 can further include a etched reflector 130, as shown in FIG. 5, with a slanted surface such that at least a portion of the light coming out of the output facet can be reflected upwards by this surface. The reflector 130 can be etched into the body material of the optical bench 100 using semiconductor plasma etching or wet etching techniques. The surface of the reflector 131 can be coated with a metal film to increase the optical reflectivity. The height (D51) of the reflector 130 is designed to be sufficiently low such that the reflector 130 does not interfere with the flip-chip bonding of the second optical chip 300. Although only part of the light coming out of the output facet 132, i.e. the optical beam with angles in X-Y plane between the optical rays R51A and R51B, is received by the reflector due to its lower height D51, it does not affect the optical measurement to determine the center of the output spot, i.e. the center of the output optical mode, in the Y direction.

Figure 6:
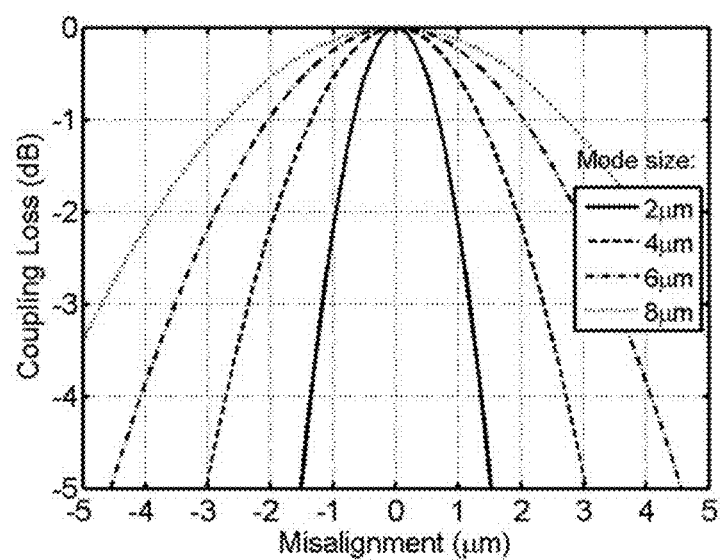
FIG. 6 is a plot illustrating the optical loss versus in-plane misalignment for matched optical waveguide modes with various mode sizes.

As stated earlier, the mode size in the Y direction of the output optical mode is increased in order to relax the alignment tolerance of the flip-chip bonding of the second optical chip 300 given that the optical waveguide mode size of the second optical chip 300 matches the output optical mode. FIG. 6 illustrates the optical loss versus in-plane misalignment for matched optical waveguide modes with various mode sizes. A typical mode size in the Y direction of a semiconductor laser chip is around 2 μm which requires ±1 μm alignment accuracy, which is statistically beyond the capability of the current state-of-art flip-chip bonding process as stated earlier, in order to guarantee less than 2 dB coupling loss. When the mode size in the Y direction is increased to 4 μm and 6 μm, the alignment tolerance for the same 2 dB coupling loss requirement is relaxed to ±2 μm and ±3 μm, respectively, which are within the capability of the current state-of-art flip-chip bonding process. When the optical waveguide of the second optical chip 300 has the same large mode size (e.g. 4 μm, 6 μm, etc.) in the Y direction, one can align it to the output optical mode with large tolerance, and achieve good optical coupling between the first optical chip 200 with a small optical waveguide mode size and the second optical chip 300 with a large optical waveguide mode size. Such good optical coupling cannot be achieved by directly aligning the same first optical chip 200 to the same second optical chip 300 due to the large optical loss from mode mismatching.

The practical use of the embodiments of the present invention comes from the fact that some optical chips such as a semiconductor laser cannot easily adopt a wider optical waveguide, i.e. large mode size, without compromising its device performance, while other optical chips such as an optical modulator or a photodetector can. Therefore, the embodiments presented here can be adopted to make a hybrid integrated optical device out of such two types of optical chips using an optical bench described in the embodiments with low optical coupling loss.

Figure 7:
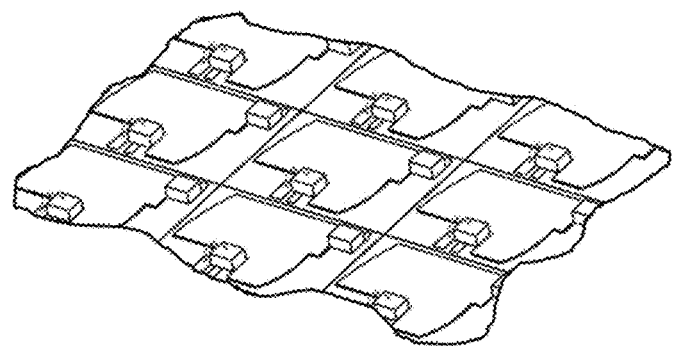
FIG. 7 is a perspective view illustrating wafer-level assembly of the hybrid integrated optical device according to an embodiment of the present invention.

Another benefit of the embodiments of the present invention, as shown in FIG. 7, is the capability of wafer level assembling of such hybrid integrated optical device. The optical bench 100 is usually made by semiconductor wafer processing technology and hundreds or even thousands of such optical benches can be processed simultaneously on a wafer. Before such processed wafer is singulated into individual dies of the optical benches, the hybrid integrated optical device can be made. Both the flip-chip bonding process and the determination of the location of the output optical mode can be performed at the wafer level. When using the method of direct measurement of the output optical mode, the first optical chip 200 is required to be powered up by an external electrical power source. It can be done by probing the electrodes 100 connecting to the first optical chip 200 on the optical bench and such wafer-level probing is widely used in the semiconductor IC industry. The whole assembling process involves only passive alignment which means no optical chip is powered up during the optical alignment which is a complex and lower-yield process. Such wafer-level passive assembling technique significantly increases productivity and reduces cost.

Figure 8A:
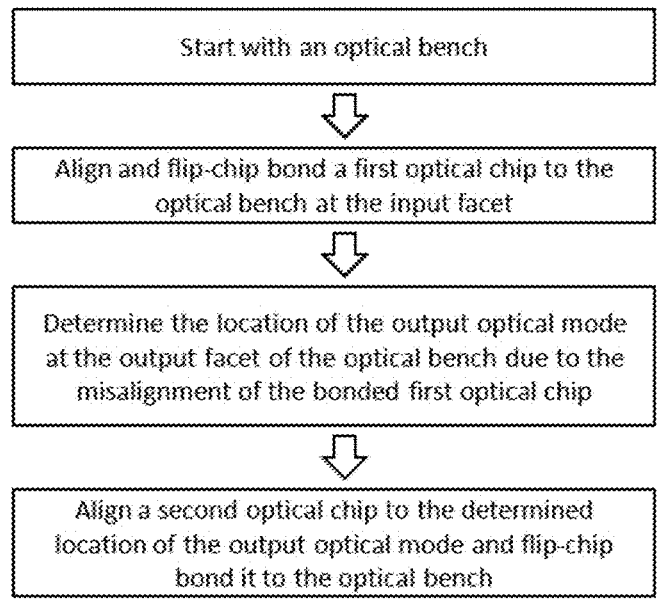
FIG. 8A is a flow chart illustrating the process of die-level assembling of the hybrid integrated optical device according to an embodiment of the present invention.
Figure 8B:
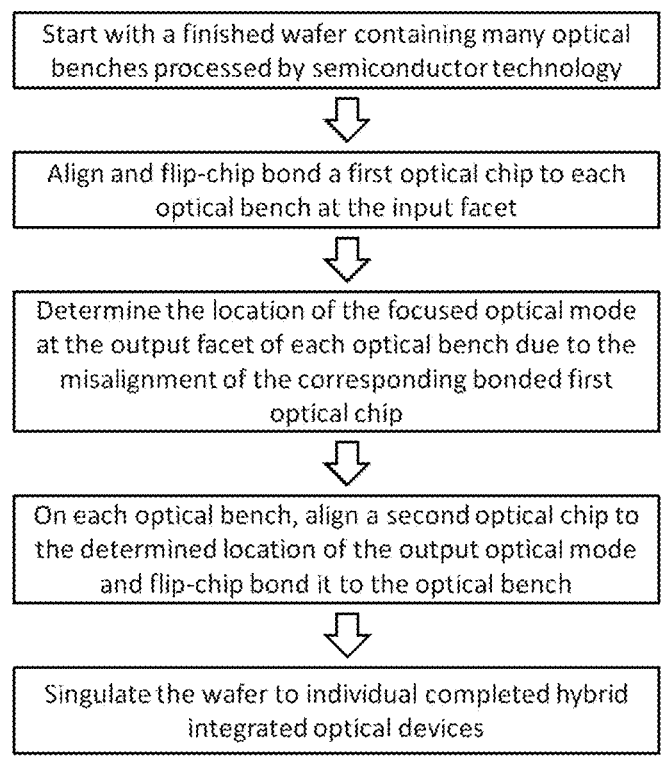
FIG. 8B is a flow chart illustrating the process of wafer-level assembling of the hybrid integrated optical device according to an embodiment of the present invention.

Two fabrication methods of the hybrid integrated optical device are shown by flow charts in FIGS. 8A and 8B. FIG. 8A illustrates the process of die-level assembling including:

a) Provide an optical bench 100;

b) Align and flip-chip bond a first optical chip 200 to the optical bench 100 at the input facet by aligning the marks on the first side of the optical chip 200 and the first side of the optical bench 100.

c) Determine the location of the output optical mode at the output facet 132 of the optical bench 100 due to the misalignment of the bonded first optical chip 200 by using the methods described earlier.

d) Align a second optical chip 300 to the determined location of the output optical mode and flip-chip bond it to the optical bench 100 by aligning the optical waveguide 301 of the second optical chip 300 to the determined location of the output optical mode.

FIG. 8B illustrates the process of wafer-level assembling which repeats all the steps in FIG. 8A for each optical bench on a whole wafer composed of optical benches, and then singulates the wafer to individual completed hybrid integrated optical devices.

It will be apparent to those skilled in the art that various modification and variations can be made in the optical system and related fabrication methods of the present invention without departing from the spirit or scope of the invention. Thus, it is intended that the present invention cover modifications and variations that come within the scope of the appended claims and their equivalents.

What is claimed is:

1. A hybrid integrated optical device comprising:
   an optical bench having a first side and a second side opposite to the first side and a large area optical slab waveguide structure formed at the first side of the optical bench,
   where the optical slab waveguide structure has at least one input facet, at least one output facet and at least one curved facet serving as a mirror such that an incoming light coupled through the input facet, as an input optical mode, diverges in the slab waveguide plane as it propagates, reflects at one or more of the at least one curved facets, and focuses to an output optical mode at the output facet with a mode size larger than a mode size of the input optical mode;
   a first optical chip having a first side and a second side opposite to the first side and an optical waveguide formed at the first side of the first optical chip; and
   a second optical chip having a first side and a second side opposite to the first side and an optical waveguide formed at the first side of the second optical chip;
   wherein the first optical chip is aligned in a vicinity of the input facet of the optical slab waveguides on the optical bench and flip-chip bonded to the optical bench with the first side of the first optical chip facing the first side of the optical bench and the optical waveguide of the first optical chip facing the input facet;
   wherein the second optical chip is aligned in a vicinity of the output facet and flip-chip bonded to the optical bench with the first side of the second optical chip facing the first side of the optical bench and the optical waveguide of the second optical chip facing the output facet.

2. The hybrid integrated optical device of claim 1, wherein the optical bench comprises:
   at least two etched trenches formed at the first side of the optical bench to receive the first and the second optical chips through flip-chip bonding process.

3. The hybrid integrated optical device of claim 2, wherein each of the etched trench of the optical bench comprises:
   a plurality of spacers formed on a surface of the etched trench to define a height of the corresponding flip-chip bonded optical chip in a direction perpendicular to the first side of the optical bench; and
   a plurality of metal traces and a plurality of micro solders disposed on the surface of the etched trench to electrically connect to a plurality of metal electrodes at the first side of the optical chips.

4. The hybrid integrated optical device of claim 1, wherein the at least one curved facet of the slab waveguide of the optical bench is coated with a metal thin film to increase the reflectivity of the light propagating in the slab waveguide.

5. The hybrid integrated optical device of claim 1, wherein the input facet of the slab waveguide of the optical bench is coated with a thin film with a predetermined reflectivity; and
   wherein the output facet of the slab waveguide of the optical bench is coated with a thin film with a predetermined reflectivity.

6. The hybrid integrated optical device of claim 1, wherein an outline of the at least one curved facet is one of a part of a parabolic curve, a circular curve, and a numerically calculated curve which is optimized for shaping the optical wave to form a focused optical mode at the output facet.

7. The hybrid integrated optical device of claim 1, wherein the optical bench further comprises:
   a reflector, formed in a body material of the optical bench, with a slanted surface in a vicinity of the output facet of the optical slab waveguide structure, such that at least a portion of the light coming out of the output facet can be reflected by the slanted surface.

8. The hybrid integrated optical device of claim 7, wherein:
   the reflector of the optical bench is coated with a metal thin film to increase reflectivity of the light.

9. The hybrid integrated optical device of claim 1, wherein each of the first and second optical chips comprises:
   a plurality of metal electrodes disposed at the first side of the optical chip to receive external electrical power and signal to operate the optical chip.

10. The hybrid integrated optical device of claim 1, wherein a width of the optical waveguide of the second optical chip is wider than a width of the optical waveguide of the first optical chip.

11. The hybrid integrated optical device of claim 1, wherein the at least one curved facet of the optical slab waveguide structure includes a first parabolic curved facet and a second parabolic curved facet, wherein axes of symmetry of the first and second parabolic curved facets are parallel to each other and form an angle with a propagation direction of the optical waveguide of the first optical chip, wherein a focus of the first parabolic curved facet is located on the input facet and a focus of the second parabolic curved facet is located on the output facet.

12. A method for fabricating a hybrid integrated optical device, comprising:
   (a) providing an optical bench having a first side and a second side opposite to the first side and a large area optical slab waveguide structure formed at the first side of the optical bench, where the optical slab waveguide structure has at least one input facet, at least one output facet and at least one curved facet serving as a mirror such that an incoming light coupled through the input facet, as an input optical mode, diverges in the slab waveguide plane as it propagates, reflects at one or more of the at least one curved facets, and focuses to an output optical mode at the output facet with a mode size larger than a mode size of the input optical mode;
   (b) providing a first optical chip having a first side and a second side opposite to the first side and at least one optical waveguide formed at the first side of the first optical chip;
   (c) providing a second optical chip having a first side and a second side opposite to the first side and at least one optical waveguide formed at the first side of the second optical chip;
   (d) aligning the first optical chip according to pre-formed marks in a vicinity of the input facet of optical slab waveguide of the optical bench and flip-chip bonding the first optical chip to the optical bench with the first side of the first optical chip facing the first side of the optical bench and the optical waveguide of the first optical chip facing the input facet;

(e) determining a location of the output optical mode along the output facet of the slab waveguide of the optical bench, including:
 (e1) either measuring a misalignment value of the first optical chip relative to the pre-formed marks, and calculating the location of the output optical mode based on the measured misalignment value; or
 (e2) directly measuring the location of the output optical mode along the output facet; and (f) aligning the second optical chip according to the determined location of the output optical mode along the output facet and flip-chip bonding the second optical chip to the optical bench with the first side of the second optical chip facing the first side of the optical bench and the optical waveguide of the second optical chip facing the output facet.

13. The method of claim 12, wherein step (a) includes providing a wafer containing multiple optical benches each having the large area optical slab waveguide structure,
 wherein steps (b) to (f) are performed for each of the multiple optical benches, and
 the method further comprising singulating the wafer into individual completed hybrid integrated optical devices.

* * * * *